Sept. 11, 1934.  H. C. HAYES  1,972,889
METHOD AND APPARATUS FOR DETERMINING DISTANCES
Filed April 27, 1929   3 Sheets-Sheet 1
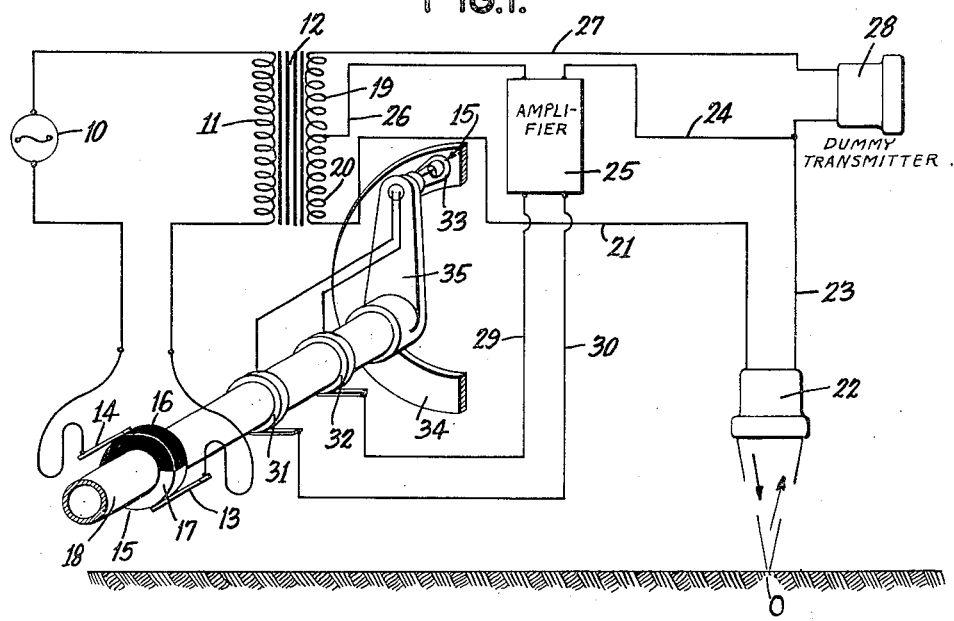
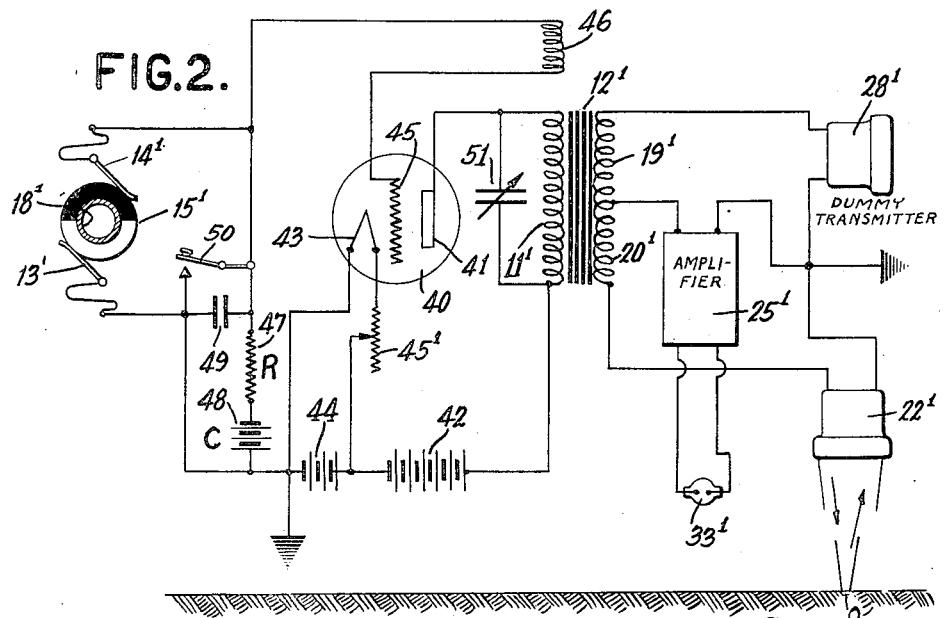
Inventor
Harvey C. Hayes
By Attorney

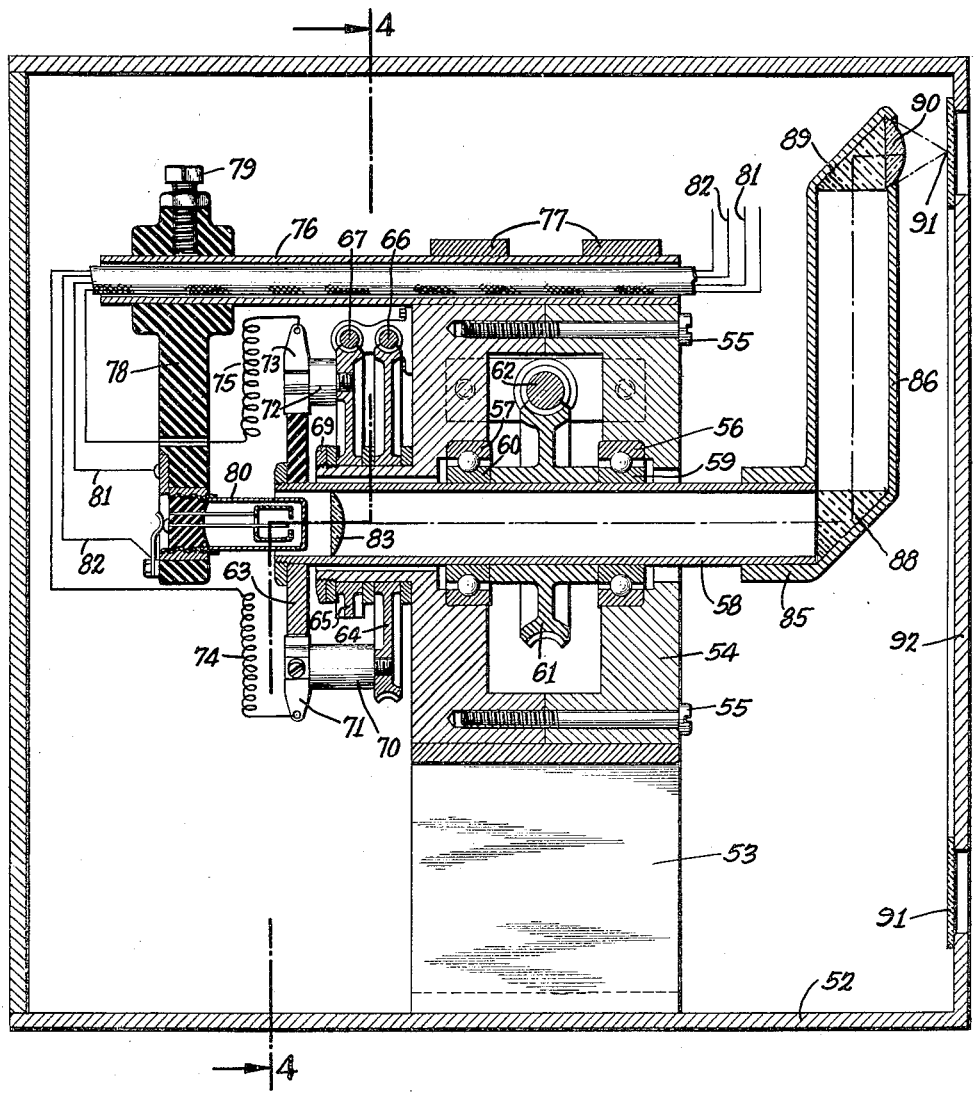

Patented Sept. 11, 1934

1,972,889

UNITED STATES PATENT OFFICE 1,972,889

METHOD AND APPARATUS FOR DETERMINING DISTANCES

Harvey C. Hayes, Washington, D. C.

Application April 27, 1929, Serial No. 358,708

3 Claims. (Cl. 177—386)

(Granted under the act of March 3, 1883, as amended April 30, 1928; 370 O. G. 757)

This invention relates primarily to improvements in methods and means for determining distances by the use of sound waves, or compressional waves. It is particularly applicable to the measuring of the depth of the ocean, or other navigable water, and provides for a substantially instantaneous determination of the distance from the bottom of a moving boat to the bed of the ocean.

Various methods and devices have been developed in the past for utilizing sound waves to determine distances by noting the time interval from the transmission of the waves to the return of their echo from the object whose distance it is desired to measure. These prior methods, however, have not been capable of accurately and speedily measuring distances at close ranges, as for example in measuring the depth of water in shoal places. This is just where the need for considerable accuracy and speed of measurement is most essential.

In general, the determination of distances by sound involves the generation of a series of sound waves at one point, as on a boat, by any suitable form of transmitter, usually electrically operated. These waves travel toward the distant object, such as the floor of the ocean, and are reflected toward the source. By then determining the interval of time elapsing between the generation of the wave impulse and its return, a basis of computing the distance is provided. It being known that the velocity of sound in water is in the neighborhood of 4800 feet per second, it is easy to determine the distance when the time of transit is known. In fact it is frequently the custom to calibrate the scales of the instruments, employed for this purpose, to read in terms of distance rather than in time.

In prior methods of this type, it has been the practice to receive the reflected waves either through the same instrument which serves as the transmitter or through a separate receiver provided for this specific purpose. Where a separate receiver is employed, it is necessary to provide some means of shielding the receiver so that it will not be affected by the direct impulse at the time of generating the sound waves but will only be affected by the reflected waves. Where the apparatus is used on a boat for depth soundings, the shielding is usually provided by the keel and intervening hull by mounting the transmitter on one side of the boat and the receiver on the other side of the boat. It will be apparent that with this arrangement the sound waves will not follow a strictly vertical course but will follow along the two sides of an isosceles triangle having the distance between the transmitter and receiver as the base. Where the depth is great in comparison with the distance between the transmitter and the receiver, the difference between the length of a side of such a triangle and its altitude is negligible. However, when the apparatus is employed in shallow waters, where it is most needed, the distance between the transmitter and the receiver may introduce a considerable percentage of error into the results. While it may be assumed that a proper correction may be made for the difference in the measurements of the side and altitude of the triangle, the correction factor will vary in accordance with the depth and any inaccuracies in the results obtainable by the use of the apparatus will be multiplied to a considerable extent for the shorter distances.

On the other hand, where the same instrument has been employed to serve as both a transmitter and a receiver, it has been a custom heretofore to connect the device alternately with the operating source for controlling the emission of a signal and with the indicator for noting the reception of the echo. This method has many inherent obstacles which are particularly harmful where short distances are to be measured. In the first place, the means for bringing about the periodic reversal of connection to and from the combined transmitter and receiver introduces complications into the system. Of greater importance, however, is the difficulty of providing means for this purpose which will respond quickly enough to the necessary changes. There is always a certain time lag in the relays which must be provided for this purpose. Where it is desired to measure depths as small as a fathom and where it is essential to provide an accuracy in this measurement to within a fraction of a fathom, it is necessary to bring about the reversal of condition of the combined transmitter and receiver within about 1/400th of a second while the elapsed time measurement should be accurate within about 1/2000th of a second. Thus, since the sound waves travel in water at a rate of about 4800 ft. per second, the impulse will travel to a depth of one fathom and return within an interval of 1/400th of a second, while to provide an accuracy of measurement within 20% will require determinations to 1/2000th of a second.

The present invention contemplates the use of the same instrument for both transmitting and receiving the sound impulses but this combined result is accomplished without the necessity of changing over from one condition to the other.

In accordance with the improved arrangement, the apparatus is always ready to provide for both functions. This is made possible by the balancing of the electrical system employed in the transmitting and receiving circuits in such a way as to prevent the transmission impulse from operating the indicating devices, or at least from disturbing them unduly, while the impulse generated upon the receipt of the reflected waves is passed to the indicator in substantially its full force.

Another feature of the invention has to do with the provision of suitable means for creating compressional wave impulses of high frequency. It is preferable from various standpoints that these waves should be of such frequency as to be inaudible. It is advantageous, not only due to the disturbing influence of the continuous repetition of the sound waves when audible but also due to the fact that the high frequency waves are much better suited for the transmission of energy into the water. By virtue of this fact the use of high frequency impulses tends to reduce the size of unit required and the amount of power necessary in the operation of the unit.

However, while I prefer to use a sound generator of a high frequency type, the balancing principle can be used with any electrical type of sound generator that can also act as a receiver of the echoes.

A further feature of the invention is in the particular method and the construction of the apparatus for indicating the distance which is being measured. This apparatus consists of suitable devices for casting a beam of light on a scale at the instant of the return of the sound impulse after reflection by the distant surface. The arrangement is preferably such that the beam of light will be focused directly upon a scale designation which will indicate either the time elapsed from the generation of the sound or the actual distance which it has travelled. To enable the proper adjustment of the apparatus, a similar beam of light may be cast upon the indicator at the time of generation of the sound impulse. This will permit the adjustment of the devices so that this first beam of light will fall upon the zero designation of the scale.

Still another feature of the invention is with respect to the method of initiating the signal or sound impulse and for determining the time of its duration. The latter is quite important, particularly where shallow depths are to be measured. It is necessary to the proper operation of the device that the duration of the signal shall be less than the time of transit of the impulse to the reflecting surface and return. This means that for depths of as little as one fathom, the signal should be limited to 1/400th of a second, or less. It has been found that sufficient energy may be imparted by a one-half cycle of the transmitter to produce the desired indication at shallow depths, although for greater depths it is necessary to provide a signal of greater duration so that the power may be built up to the required extent. Where high frequency vibrations are employed, it is obvious that it will never be necessary to rely upon less than a single oscillation and in most cases a number of oscillations, all falling within 1/400th of a second, will be permissible. Since it is desirable to take readings from the indicator with respect to an initial zero point, it is highly preferable to provide for separate adjustment of the starting time and time of duration of the signal. Independent adjustment of these functions is contemplated by the present invention.

With the foregoing and other features and advantages, which will become more apparent as the description progresses, the invention will now be described in greater detail by reference to the accompanying drawings which disclose certain illustrative embodiments. In the drawings:

Figure 1 is a diagrammatic representation of suitable apparatus and circuits for carrying out certain phases of the invention.

Figure 2 is a similar showing of a modified form of apparatus and circuits adapted for the generation and use of high frequency impulses.

Figure 3 is a view in sectional elevation of one form of the indicating and control apparatus.

Figure 4:
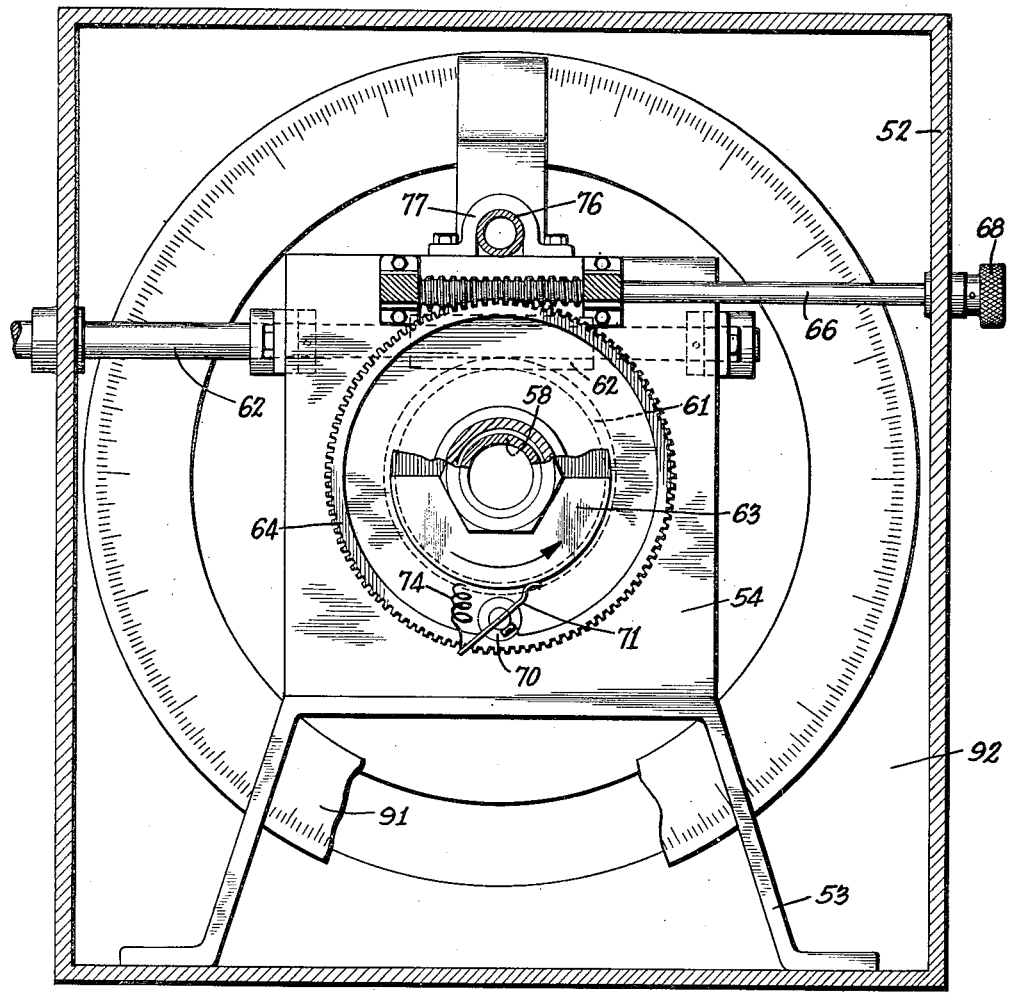
Figure 4 is a sectional view taken along the line 4—4 of Figure 3.

Referring now to Figure 1, it discloses in general a balanced electrical system for controlling a combined transmitter and receiver and for operating the latter by means of current from an alternating current generator. As shown, the generator 10 will preferably be placed in circuit with the primary winding 11 of a transformer 12. Suitable devices are provided in this circuit for periodically making and breaking the latter. These devices may assume the form of a pair of brushes 13 and 14 connected respectively to opposite points of a break in the circuit. The brushes may co-operate with a ring or disc 15 having one section 16 formed of insulating material and a section 17 formed of conducting material. The ring is secured to a shaft 18 which is constantly rotated at a desired speed, as for example one revolution per second. Any suitable means, such as an electric motor acting through reduction gearing may be provided for driving the shaft 18 at a uniform speed. The brushes 13 and 14 are so located that for a brief interval during the rotation of the shaft 18, both will bear upon the conducting section 17 of the ring 15. When this occurs, the circuit from the generator 10 through the primary winding 11 will be completed. As will be more fully explained in connection with Figures 3 and 4, the brushes 13 and 14 will preferably be separately adjustable so that brush 14 may determine the instant of commencement of the signal while brush 13 may independently determine the duration of the signal.

The transformer 12 is provided with two secondary windings 19 and 20, which are preferably of the same number of turns and are electrically equivalent. They may be formed by merely tapping in at the midpoint of the usual secondary coil. A connection 21 may lead from one end of the coil section 20 to a transmitter 22. Conductors 23 and 24 may serve to connect the transmitter with one terminal of an amplifying unit 25. The opposite terminal of this unit may then be connected by a conductor 26 to the opposite end of the coil section 20, or to the midpoint of a single secondary winding. In this way it will be seen that a circuit is completed through the transmitter and amplifier in series with the coil section 20. In a similar way the coil section 19 may be connected in series with the amplifier 25 and with a dummy transmitter 28, a connection 27 being provided from the latter back to the opposite end of the coil. The dummy transmitter 28 should be electrically equivalent, insofar as inductance, capacity and resistance are concerned, to the transmitter 22. This being the case, and it being assumed that the connection 24 is attached to the connection 23 between the two transmitters 22 and 28 at its midpoint, it will be apparent that when a current is induced in the secondary winding of the transformer 12 due to the making of a circuit through the primary winding of the latter, no current will pass through the branch 24, amplifying unit 25 and branch 26. This will be understood from the fact that it may be assumed that equal and opposite currents will tend to pass through this part of the circuit from the two coil sections 19 and 20, or, looking at it in another way, there will be no difference in potential between the midpoint of the secondary winding of the transformer and the midpoint between the electrically equivalent transmitters 22 and 28.

In practice, it is desirable to modify the connections, or possibly the construction, of the dummy transmitter 28 in such a way that a slight current will pass through the amplifying unit 25 whenever the circuit is closed between the brushes 13 and 14. The current which would thus be permitted to flow through the amplifier would be the differential between that in the two transmitters and would not unduly overload the amplifying unit. The purpose of permitting this slight current, as will more clearly appear, is to provide an indication of the generation of the signal. It will be apparent that the current required to operate the transmitter 22 is quite heavy and that it would destroy the sensitive vacuum tube amplifying unit if it were all allowed to pass through this unit.

While it has been stated that the dummy transmitter 28 should be the electrical equivalent of the transmitter 22 and the two coil sections 19 and 20 have been stated to be preferably equivalent, this is not absolutely essential. These individual devices may have quite different characteristics, provided the joint effect of the coil 19 and dummy transmitter 28 is substantially equivalent to that of the coil section 20 and transmitter 22. It should be understood also that the dummy transmitter need not be provided with the sound generating devices and it is preferably not so provided. Its electrical properties are all that need be considered.

Assuming now that the circuit is completed through the brushes 13 and 14, a compressional wave impulse will be sent out through the transmitter 22. The waves so generated will travel to the bottom of the ocean to a point designated O and will return to the transmitter, which by this time will no longer be activated. The return of the reflected impulse, however, will set up a small current within the transmitter, which now acts as a receiver or generator, and this current will be passed through the circuit formed by the elements 23, 24, 25, 26, 20 and 21. A small portion of the current may be dissipated through the dummy transmitter 28 and the coil section 19, but due to the high resistance of this circuit as compared with that through the amplifier, only a small percentage of the current will be lost. A major portion of the current set up by the reflected waves will be passed to the amplifying unit. From the output terminals of the latter suitable connections may be provided to any form of indicating device; for example conductors 29 and 30 may be connected through brushes to a pair of slip-rings 31 and 32 mounted on the shaft 18. The slip-rings may in turn be connected by suitable conductors to an electric flash lamp 33 which, as more fully explained hereinafter, may be so arranged as to cast a beam of light upon an indicator scale 34. The lamp 33 may be of any suitable type, but preferably a lamp of the Neon or Geissler tube type will be used. The lamp 33, or other means for casting the desired beam, may be mounted in an arm 35 secured to the shaft 18 so as to describe a circle of suitable radius over the co-related annular scale.

By proper adjustment of the brush 14, the closing of the circuit through the primary winding 11 of the transformer may be made to coincide with the passage of the lamp 33, or a beam of light from it over the zero point of the scale. It is in order to enable calibration of the apparatus to insure this relation that the brush 14 is made adjustable and the dummy transmitter unit is thrown slightly out of balance with the main transmitter to create a signal at this time. Since the apparatus is initially adjusted so that the beam of light sent out by the lamp 33 at the time of generation of the sound waves will coincide with the zero mark of the scale 34, the indication on the latter, which is subsequently illuminated when the reflected waves reach the transmitter 22 and the resulting current is amplified, will indicate directly either the desired distance or the elapsed time, from which the distance may be computed.

In Figure 2 there is shown a modified construction which differs from that shown in Figure 1, primarily in the nature of the source of the alternating current for operating the transmitter. The system here disclosed is particularly suited for the development of high frequency impulses. It has been found that a vacuum tube forming part of an oscillating circuit may be employed to advantage in effecting the control of the transmitter. Thus, a vacuum tube 40 may have its plate 41 in circuit with the primary winding 11' of a transformer 12' corresponding to the transformer 12 of Figure 1. This circuit may be completed by means of a connection from the opposite end of the coil 11' to a "B" battery 42, or other source of direct current of proper voltage, and there to the filament 43 of the vacuum tube. The filament may be heated in the usual way by means of a source of current or "A" battery having in circuit therewith a suitable variable resistance 45'.

In the grid circuit of the system there may be provided an inductance 46 connected to the grid terminal of the vacuum tube and at its opposite end connected to a resistance 47 and a "C" battery, or other source of current, 48. This circuit may then be completed by connection with one terminal of the filament. A parallel connection around the resistance 47 and battery 48 may include a condenser or capacity 49. For the purpose of throwing the system into oscillation, the bias normally applied by the "C" battery may be offset by suitable means for shunting the battery from the grid circuit. This may be accomplished by the use of a key 50 which may be operated at will to close the shunting circuit that is normally open. When the key is depressed, the circuit from the battery 48 will be completed through the resistance 47 and the key.

In lieu of the key 50 or if desired in supplement to the latter by a parallel connection, a continuous make and break device may be provided for the same purpose. This may assume the same form as the devices shown in Figure 1, including a pair of brushes 13' and 14' and a ring or disc 15' formed partly of insulating material and partly of conducting material, secured to a rotating shaft 18'. A variable condenser 51 may be placed across the terminals of the primary coil 11' and will serve as suitable means for controlling the frequency of the oscillating system. It will be understood that by the arrangement disclosed, each time a circuit is completed through the brushes 13' and 14', which may, for example, be every second, an impulse will be set up in the coil 11' having a frequency determined by the effect of the variable condenser 51 on the oscillating system. If desired, a number of amplifying stages may be introduced into the system between the transformer 12' and the transmitter circuit. This would permit the use of smaller power on the initial stage illustrated and thus avoid excessive sparking in the making and breaking of the grid circuit, whose voltage would thus be lower. The final stage of amplification would then include a transformer having a primary winding equivalent to the coil 11'.

The remaining portions of the system may be substantially the same as that illustrated in Figure 1; for example a secondary coil having two equivalent sections 19' and 20' may serve to activate the dummy transmitter 28' and effective transmitter 22'. Under this arrangement the transmitter 22' will be operated at such high frequencies that only inaudible compressional waves will be sent out. A suitable amplifying unit 25' may be connected between the midpoint of the coils 19' and 20' and the midpoint between the two transmitters. In this way, as previously explained, the system will be normally balanced, or substantially so, so that the impulse induced by the oscillating circuit will not disturb the amplifying unit, or at most will produce only a small effect thereon, while the reflected waves will generate a current within the transmitter 22', which will be passed to the amplifying unit in substantially its full force. The output terminals of the amplifying unit 25' may be connected in any suitable way to the flash lamp 33', which may co-operate with a scale 34' in the manner of the corresponding elements of Figure 1, or in the way to be described in connection with Figures 3 and 4. All that is necessary is that the time interval between the flash created upon the generation of the sound impulses and the flash created by the subsequent reception of the reflection of these impulses should be accurately measured.

Referring now to Figures 3 and 4, a suitable method of construction and mounting the flashing system with relation to other rotating parts is disclosed.

A casing 52 may be provided for enclosing and protecting the essential parts of the flashing and signal controlling system. Supported by the base of the casing, a bracket or frame 53 may be provided and adapted to carry a bearing block 54. This block will be so formed as to provide a horizontal, central aperture and an enlarged opening of suitable size and form at the center of the block. For this purpose the block will preferably be formed in two sections which may be secured together by means of suitable bolts 55. A pair of annular bearing rings 56 and 57, formed of suitable bearing material such as steel, may be fitted into annular recesses in the two sections of the block. A tubular shaft 58, having secured thereto a pair of annular journal members 59 and 60, co-operating with the bearing rings 56 and 57, passes through the central opening in the bearing block. If desired, a roller-bearing or ball-bearing journal may be provided between the tubular shaft and the bearing elements. Secured to the shaft 58, and preferably between the journal members 59 and 60, is a worm-wheel 61 co-operating with a driving-worm 62. The latter, at its opposite end, may be connected to any suitable driving source outside of the casing 52. This will preferably be in the nature of a constant-speed motor which, through suitable reduction gearing, will drive the worm-shaft 62 at such a speed as to rotate the shaft 58 at the desired rate, as for example about one revolution per second.

Also secured to the shaft 58, near its left-hand end, (Fig. 3) is a commutator disc 63. This disc corresponds to that designated 15 in Figure 1 and is preferably formed half of insulating material and half of copper or other conducting material. On a small annular extension of the left-hand member of the bearing block 54, there is loosely mounted a pair of worm-wheels 64 and 65. These co-operate respectively with a pair of driving-worms 66 and 67 which are adapted to be manually rotated for the purpose of adjusting the worm-wheels. A thumb-wheel 68, (Fig. 4) is preferably provided on the outer end of each of the worms 66 and 67 outside of the casing for the purpose of permitting the desired adjustment. Any suitable means, such as a pair of lock-nuts 69, may be mounted on the outer end of the annular extension of the bearing block to hold the worm-wheels in position. Suitable spacing collars or washers will also be provided to hold the assembly in its proper relation.

The bottom portion of the worm-wheel 65 may be cut away to any extent desired, preferably leaving only a collar or hub for substantially half of its circumference, to provide clearance for a stud 70, which may be screwed into, or otherwise secured to, the worm-wheel 64. At its opposite end this stud may be suitably slotted, or otherwise formed, to receive a brush 71 which is adapted to co-operate with the periphery of the commutator disc 63. The brush may be secured to the stud by any suitable means, as by a set-screw, as shown in Figure 4. Similarly, a stud 72 carried by the worm-wheel 65 near the top, as shown in Figure 3, is adapted to hold a brush 73, which is likewise adapted to co-operate with the commutator disc 63. The studs 70 and 72 are formed of insulating material or are otherwise insulated from the worm-wheels 64 and 65. Suitable electrical conductors 74 and 75 may be connected to the brushes 71 and 73, respectively, and may serve to connect the latter with appropriate points of the electrical circuits indicated in Figures 1 and 2. It will be understood that brushes 71 and 73 correspond respectively to brushes 13 and 14 of Figure 1, or 13' and 14' of Figure 2. By adjustment of one of the brushes, the initial starting point of the signal will be determined while the adjustment of the other brush will serve to independently determine the duration of the signal. Which brush will determine each of these functions will depend upon their relative position. Assuming that the commutator disc is half conducting and half non-conducting, that the two brushes are at a less angular distance apart on the right side of the center of shaft 58 (Fig. 4) than on the left, and that the shaft rotates in the direction indicated by the arrow, then the brush 73 will determine the beginning of the signal and brush 71 its duration. By separating the brushes to a greater extent so that they are more nearly at diametrically opposite points, the duration of the signal will be decreased. It is, of course, always necessary that the duration of the signal shall be less than the time of transit of the wave to the bottom of the ocean and return. In very shallow depths this may call for a signal of very short duration. If a low pitched transmitter of, say, 540 cycles per second should be employed and a signal of half a cycle duration were permissible for short ranges, then a distance of about half a fathom could be measured. With a higher pitched transmitter a signal of several cycles might be employed to effect the same measurement.

The conductors 74 and 75 may be passed through a tube 76 secured to the top of the bearing block by means of a pair of clamps 77 and they may then pass through an opening in the casing 52 or be attached to suitable binding posts carried by the casing. The tube 76, near its left end, may serve to support a depending arm 78 formed preferably of some insulating material, such as phenolic condensation product, and adapted to be shifted along the tube to any desired position and then clamped in place by means of a set-screw 79. If desired, the conductors 74 and 75 may be passed through suitable openings in the arm 78, as well as through the passage of the tube 76.

Near its lower end the arm 78 may be provided with a suitable socket adapted to receive an electric lamp 80. A conductor 81 leading to a portion of the socket, together with a conductor 82 in electrical connection with the central contact of the electric lamp, may also be passed through the tube 76 and thence through the casing 52 or by means of binding posts thereon to the output terminals of the amplifying unit 25 of Figure 1 or 25' of Figure 2. In this way the lamp 80 will be flashed under the conditions previously explained with respect to the lamps 33 and 33'.

As shown in Figure 3, the lamp 80 is in direct alignment with the central passageway of the shaft 58. The latter, near its left end, is provided with a condensing lens 83 which is adapted to converge the rays from the lamp into a parallel stream of rays. A proper focus may be obtained for this puropse by the adjustment of the arm 78 along the tube 76. At the right end of the shaft 58 there is secured a hollow arm or tube 85 having a passageway 86 at right angles to the shaft 58 and having an elbow formation at its point of juncture with the shaft. A prism 88 may be mounted in the elbow of the tube 85 and for this purpose a flat side 88 may be provided in the elbow. The prism will serve to refract the parallel light rays from the lens 83 and direct them in a parallel stream through the tube 85. At its opposite end this tube may be provided with a second prism 89 which will again refract the light rays and direct them in a parallel stream toward a lens 90 mounted adjacent the prism 89. The lens 90 will tend to converge the light rays toward a relatively small spot and thus focus the beam of light on a scale member 91, situated at the focal point. This member is preferably formed of translucent material and is provided with suitable scale marks co-operating with the light spot produced by the lens 90. The member 91 may either be of annular formation, as shown, having its central opening closed by an opaque disc 92, or, if desired, it may be in the form of a single translucent disc having an annular section graduated near its outer edge.

For the purpose of providing a sharp reference line to co-operate with the markings on the member 91, the lens 90 may be provided with a hair-line radial to the shaft 58. This hair-line will show up in the spot or image produced by the flash of the lamp 80 and will provide a sharp line of reference with respect to the graduations on the member 91. If, as previously assumed, the shaft 58 is made to rotate at a speed of one revolution per second, the member 91 may be divided by graduations into 400 equal parts, each graduation representing a distance of one fathom. This is for the reason that sound waves are known to travel in water at a velocity of about 4800 feet per second. A sound impulse, therefore, sent out from a ship will travel to the bottom of the ocean and back to the ship in one second, if the depth is 2400 feet, or 400 fathoms. In this way, by employing an arm 86 of appropriate length, graduations of sufficient size are provided to enable accurate readings to be taken to within a fraction of a fathom. At the same time the apparatus is adapted to cover the entire range of depths which may be encountered without the necessity of providing gear-shifting mechanism to change the speed of the rotating parts. If depths over 400 fathoms are to be measured, it is merely necessary to count the number of complete revolutions of the tube 85 or the number of complete seconds between the sending of a signal and the reception of the reflected echo. In the form of transmitting apparatus shown in Figure 2, this can very readily be determined by depressing the key 50, then for more accurate determination of the fractional portion of the 400 fathom distance to be included, the automatic signal device under control of the commutator 15 or 63 may be put into use.

Operations of the various portions of the apparatus have been described in such detail in the foregoing sections that no general summary of operation is believed to be required.

While certain specific details of construction have been mentioned, and certain definite dimensions or values have been given in the foregoing description, it is to be understood that these have been specified merely for the purposes of illustration and that many changes may be made within the contemplation of the present invention. It is not desired to be limited other than by the scope of the claims which follow.

The invention described herein may be manufactured and used by or for the Government for governmental purposes without the payment to me of any royalty thereon.

What I claim is:

1. In sound ranging apparatus means for generating periodic alternating current impulses, a transformer having its primary winding in circuit with said means, a sound transmitter adapted to convert electrical impulses into sound and sound into electrical impulses, a dummy transmitter having substantially the same electrical characteristics as the sound transmitter, said transmitters being connected in series with the secondary winding of said transformer, and electrical indicating means connected between an intermediate point of said secondary winding and a point between said sound and dummy transmitters.

2. In sound ranging apparatus an electrically operated sound transmitter adapted to convert electrical impulses into sound and sound into electrical impulses, a dummy transmitter, separate circuits for said sound and dummy transmitters, said circuits having a branch in common, means for setting up substantially equal current impulses in said circuits, the currents in said common branch tending to flow in opposite directions, and indicating means controlled by current flowing through said branch.

3. In sound ranging apparatus, means for generating periodic alternating current impulses, a sound transmitting-receiving device adapted to convert electrical impulses into sound and sound into electrical impulses, an electrical device having substantially the same electrical characteristics as said transmitting-receiving device, said transmitting-receiving device and said electrical device being connected in a series circuit, means for inductively coupling said generating means to said series circuit, and electrical indicating means connected across said series circuit between a point intermediate said transmitting-receiving device and said electrical device, and said coupling means.

HARVEY C. HAYES.